United States Patent [19]

Carraro

[11] Patent Number: 4,741,875

[45] Date of Patent: May 3, 1988

[54] CENTRIFUGAL MOLDING OF PRESTRESSED PILES

[76] Inventor: Amadeo Carraro, Via Bottenigo, 50, 30030 Chirignago, Venezia, Italy

[21] Appl. No.: 890,276

[22] Filed: Jul. 29, 1986

[30] Foreign Application Priority Data

Aug. 2, 1985 [IT] Italy .............................. 84133 A/85

[51] Int. Cl.[4] ........................ B28B 1/20; B28B 23/08; B28B 23/10; B29C 41/04

[52] U.S. Cl. .................................... 264/228; 264/229; 264/311

[58] Field of Search ........................ 264/228, 229, 311

[56] References Cited

U.S. PATENT DOCUMENTS

| | | | |
|---|---|---|---|
| 866,712 | 9/1907 | Campbell | 264/311 |
| 1,528,518 | 3/1925 | Watson | 264/311 |
| 2,474,660 | 6/1949 | Fitzpatrick | 264/228 |
| 2,916,794 | 12/1959 | Gerwick, Jr. | 264/228 |
| 3,088,187 | 5/1963 | Justice | 264/228 |
| 3,382,680 | 5/1968 | Takano | 264/228 |
| 3,589,088 | 6/1971 | Siedl | 264/228 |
| 3,652,756 | 3/1972 | Van Buren | 264/228 |
| 3,716,210 | 2/1973 | Fukushima et al. | 264/228 |
| 4,113,823 | 9/1978 | Iida | 264/228 |

FOREIGN PATENT DOCUMENTS

| | | | |
|---|---|---|---|
| 0754471 | 3/1967 | Canada . | |
| 43-7155 | 3/1968 | Japan | 264/229 |

*Primary Examiner*—Jan H. Silbaugh
*Assistant Examiner*—Karen D. Kutach
*Attorney, Agent, or Firm*—Charles W. Fallow; Martin P. Hoffman; Mitchell B. Wasson

[57] ABSTRACT

The method for forming prestressed centrifugal piles by:

disposing a spiral within one of the two constituent half-shells of the mould for the pile to be formed, securing within this spiral a plurality of strands having at least one end emerging from a mould headpiece, pouring the concrete into said half-shell, joining the two half-shells together, inserting axial restraint elements for the strands through suitable apertures provided in the half-shells, tensioning the strands at those ends which emerge from the headpiece and, centrifuging the mould prepared in this manner..

2 Claims, 2 Drawing Sheets

CENTRIFUGAL MOLDING OF PRESTRESSED PILES

BACKGROUND

This invention relates to a method for forming prestressed centrifugal piles, a mould for implementing the method, and a pile obtained by the method.

Methods are known for forming prestressed centrifugal piles of frusto-conical shape. One of these known methods uses two metal half-shells forming a mould inside which a reinforcement is placed consisting of a ring of steel strands of length slightly greater than the length of the mould, together with a spiral located on the outside of the strands.

In order to maintain the strand cross-section/pile cross-section ratio substantially constant, and thus prevent fracture of the concrete when subjected to non-uniform prestressing, it is known to progressively deviate the strands towards the mould interior, so that portions of them lie within the central cavity which is obtained during the subsequent centrifuging stage, or to cover end portions with a sheath. In this manner, although the strands extend over a length equal to the pile length, they do not adhere to the concrete beyond a certain point, and therefore do not transmit their load fraction thereto.

This method however has the drawback of a certain laboriousness due to the need to prepare the end portions of the strands.

In another known method, the reinforcement consists of strands of different lengths, secured to a spiral disposed on their inside.

This known method has the drawback that the hooping effect is lost, so that the pile has limited load resistance.

An object of the invention is to obviate the drawbacks of known methods, by providing a method for forming prestressed centrifugal piles of high load resistance.

A further object of the invention is to provide a method which enables the strands to be easily anchored within the mould.

SUMMARY OF THE INVENTION

These objects are attained according to the invention by a method for forming prestressed centrifugal piles, characterised by:

disposing a spiral within one of the two constituent half-shells of the mould for the pile to be formed, securing within this spiral a plurality of strands having at least one end emerging from a mould headpiece, pouring the concrete into said half-shell, joining the two half-shells together, inserting axial restraint elements for the strands through suitable apertures provided in the half-shells, tensioning the strands at those ends which emerge from the headpiece, centrifuging the mould prepared in this manner.

Preferably, the method is characterised by:

disposing a spiral within one of the two constituent half-shells of the mould for the pile to be formed, securing within this spiral a plurality of strands having at least one end emerging from a mould headpiece, radially inserting, through suitable apertures provided in the half-shell, axial restraint elements for the strands disposed within said half-shell, pouring the concrete into said half-shell, joining the two half-shells together, radially inserting, through the other half-shell, axial restraint elements for the strands disposed within said half-shell, tensioning the strands at those ends which emerge from the headpiece, centrifuging the mould prepared in this manner.

BRIEF DESCRIPTION OF THE DRAWINGS

A preferred embodiment of the present invention is described in detail hereinafter by way of non-limiting example with reference to the accompanying drawings in which.

DESCRIPTION OF THE PREFERRED EMBODIMENT

Figure 1:
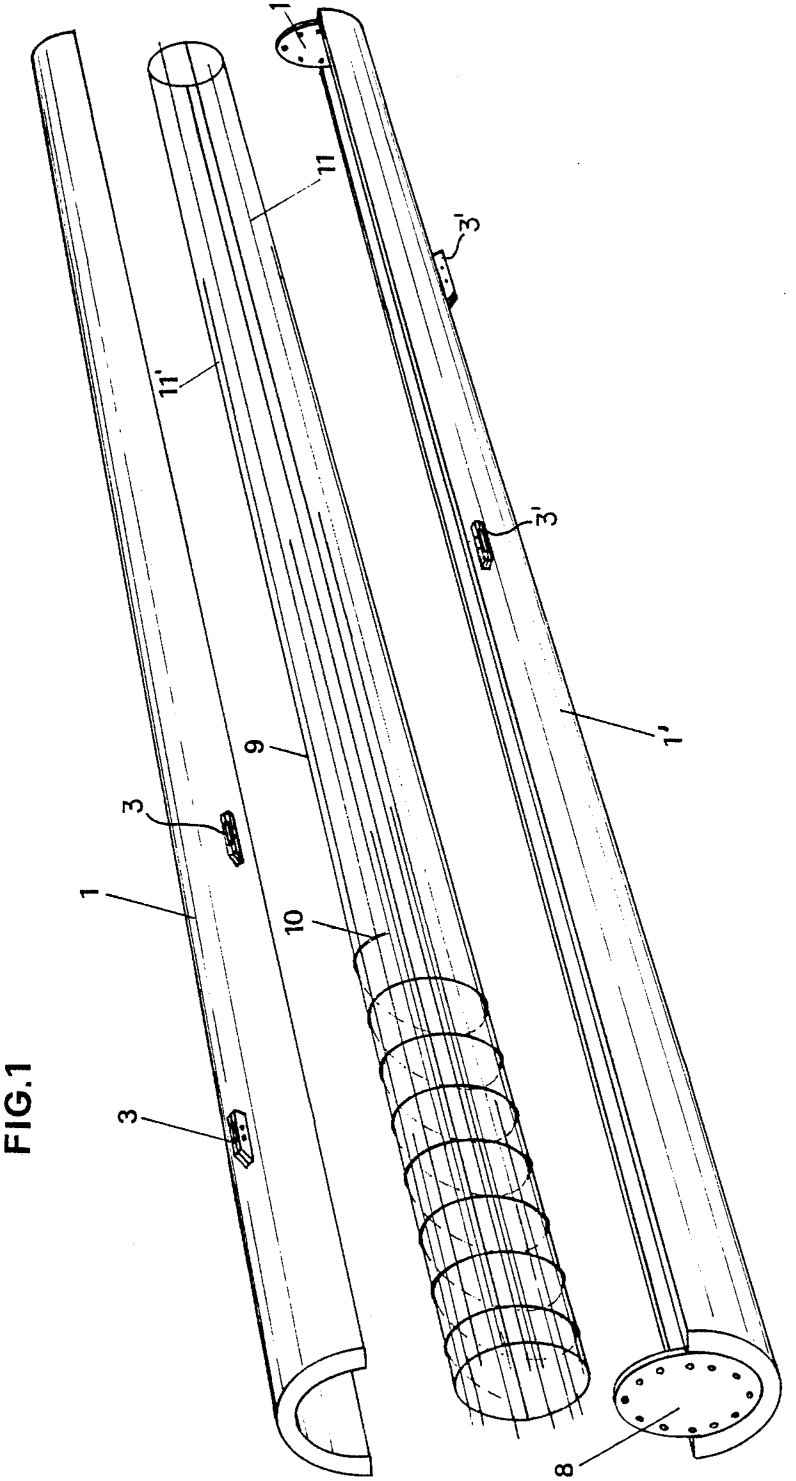
FIG. 1 is a diagrammatic exploded perspective view of a mould for implementing the method according to the invention.
Figure 2:
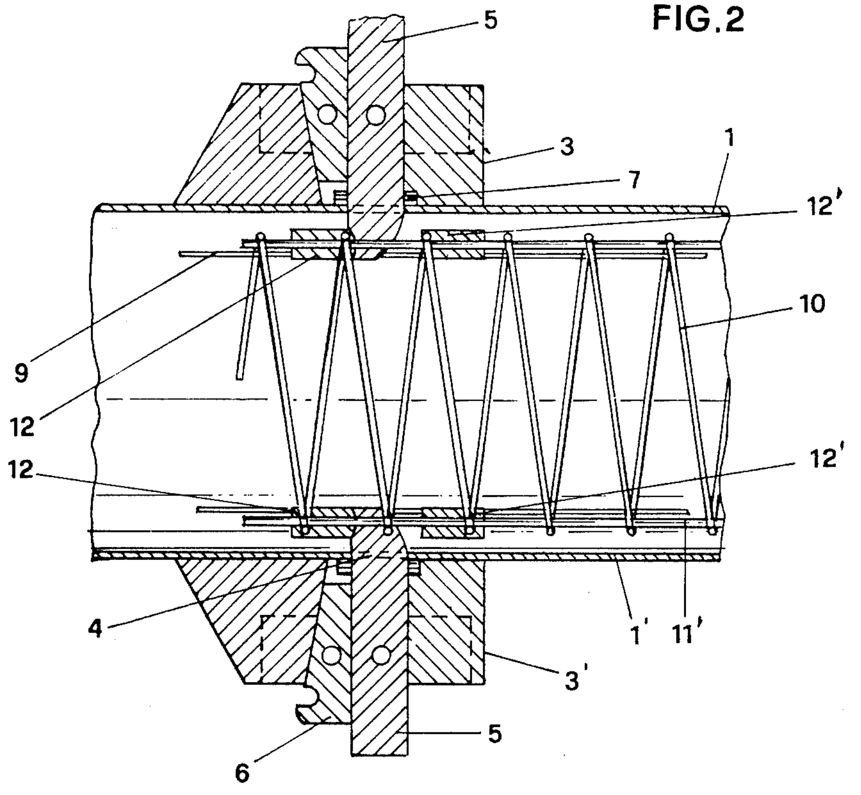
FIG. 2 is a partial longitudinal section therethrough.
Figure 3:
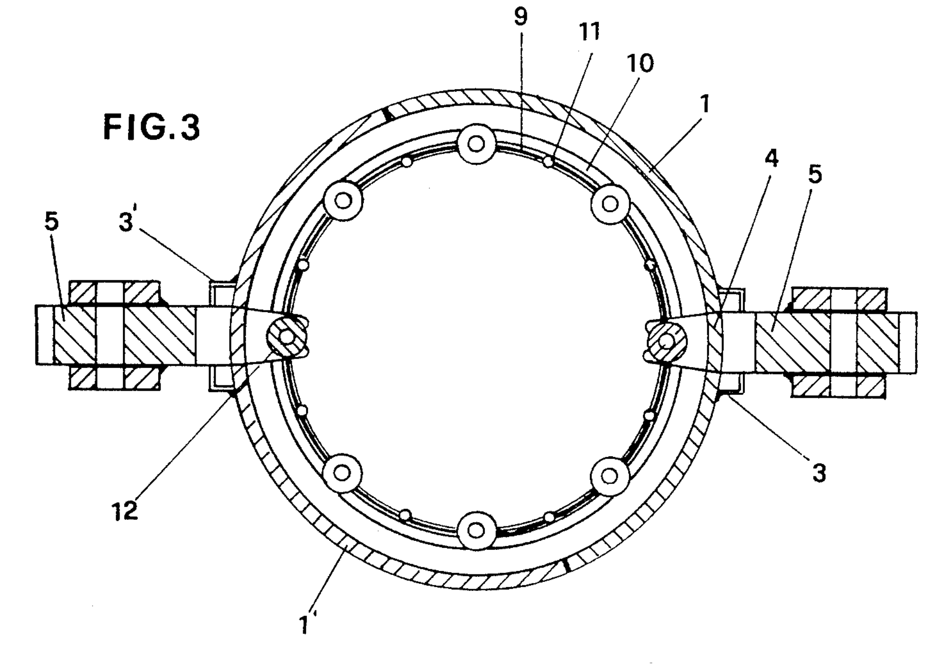
FIG. 3 is a cross-section therethrough.

As can be seen from the figures, the method according to the invention uses for its implementation a metal mould of substantially frusto-conical shape, formed from two half-shells 1,1'.

Housings 3 (four in number in the illustrated example) are welded at equiangular spacing along the half-shell 1 in predetermined positions determined by static calculations, and are diametrically opposite housings 3' welded to the half-shell 1'. The housings 3,3' define apertures 4 for communication with the interior of the half-shells 1,1'. Forks 5 are removably inserted through said apertures and can be rigidly locked therein by means of plugs or wedges 6.

Each fork 5 and each plug 6 can also be locked with respect to the corresponding housing 3,3' by pins (not shown on the drawings). A gasket 7 provides a seal between the fork 5 and the corresponding half-shell 1,1'.

Perforated headpieces 8,8' are fixed to the ends of the half-shell 1. In the illustrated example, the headpiece 8 has twice the number of holes as the headpiece 8'.

The method for forming the prestressed centrifugal pile according to the invention is as follows:

A metal lattice 9 of preferably frusto-conical shape about which a metal spiral 10 is wound is positioned within the half-shell 1.

Harmonic steel strands 11,11' of different lengths are inserted into the inside of the spiral 10 and are secured to it by means of iron wire. In particular, the strands 11,11' are positioned equidistant from each other such that each of them passes by a housing 3,3'. In the illustrated example, the strands are sixteen in number, eight of which, 11, extend over the entire length of the mould and have their ends emerging from the headpieces 8,8' respectively. The other eight strands 11' are of gradually decreasing length in pairs so that whereas all the strands 11' emerge from the headpiece 8 of larger section, they extend for a length which slightly exceeds the distance between the headpiece 8 and the corresponding aperture 4.

Conventional axial restraint clamps (not shown on the drawings) are then applied to those ends of the strands 11 which emerge from the headpiece 8'. Cylindrical blocks 12,12' are clamped to those ends of the strands 11' lying within the half-shell 1, in such a manner that said blocks 12, 12′ straddle the aperture 4 in the vicinity of which the corresponding strand terminates.

In particular, the block 12 has that base facing the block 12′ curved to correspond to a curved portion of the prongs of the forks 5.

The forks 5 are then inserted through the apertures 4 of the half-shell 1 so that their prongs engage the end of the corresponding strand 11′ within the portion bounded by the two blocks 12,12′. The plugs 6 are then inserted and are locked by means of pins.

Concrete in a semi-fluid state is then poured into the half-shell 1 arranged in this manner, after which the half-shell 1′ is placed on and fixed to the half-shell 1 in the conventional manner.

The forks 5 are then inserted through the apertures 4 of the half-shell 1′ so that they engage the ends of the strands 11′, by an operation similar to that heretofore described.

A tensioning device is then fitted to those ends of the strands 11,11′ which emerge from the headpiece 8 in order to stretch the strands 11,11′, after which plugs are fitted to said ends to prevent the strands 11,11′ returning to their original configuration.

The mould arranged in this manner is positioned on a conventional vibrating-centrifuging machine for compacting the concrete. When curing is complete,, the plugs 6 and forks 5 are removed, and after opening the two half-shells 1,1′ the pile is removed and the mould prepared for a new cycle.

It is apparent that because of the compressive force to which the strands are subjected, it could be difficult at this stage to disengage the forks from them. This is facilitated by the particular curved shape of the base of the blocks 12, which allows the forks to be slightly rotated. It should also be noted that the purpose of the blocks 12′ is to prevent the strands from sliding within the concrete after this has hardened. In this respect, when the forks 5 have been disengaged, the blocks 12 are no longer restrained at their front as they have a hollow space in front of them.

From the aforegoing it is apparent that the method for forming prestressed centrifugal piles according to the invention results in numerous advantages, and in particular:

it enables high-strenth piles to be formed because of the possibility of using a spiral disposed on the outside of the ring of strands, it enables the strands to be secured simply and comfortably.

Inasmuch as the invention is subject to many variations and modifications, it is intended that the foregoing description and drawings shall be interpreted as merely illustrative of the invention whose scope is defined by the following claims.

I claim:

1. A method for centrifugally forming prestressed piles, comprising steps of providing a mould comprising two semicylindrical half-shells with ends bounded by respective headpieces having apertures therein, said half-shells further having lateral apertures therein, disposing a spiral within a first of the two half-shells of the mould for the pile to be formed, securing within said spiral a plurality of strands, each strand extending along an axis parallel to that of the mould, each having at least one end emerging from a mould headpiece, and at least some of said strands having one end thereof terminating within the mould, in the vicinity of respective ones of said lateral apertures, affixing a first block to each of those strands terminating within the mould, in proximity to a respective one of said lateral apertures, pouring concrete into said first half-shell, joining the two half-shells together, then inserting elements for axially restraining the blocks through said lateral apertures provided in the half-shells, tensioning the strands at those ends which emerge from the headpiece, and centrifuging the mould prepared in this manner.

2. The method of claim 1, comprising a further step of affixing, to each of those strands terminating within the mould, a second, block spaced from the first block a distance sufficient to admit the restraining element between the blocks, this further step being done prior to said pouring step.

* * * * *

UNITED STATES PATENT AND TRADEMARK OFFICE

CERTIFICATE OF CORRECTION

PATENT NO. : 4,741,875

DATED : May 3, 1988

INVENTOR(S) : Amedeo Carraro

It is certified that error appears in the above-identified patent and that said Letters Patent is hereby corrected as shown below:

On the cover page, the inventor's name "Amadeo Carraro" is changed to --Amedeo Carraro--.

Signed and Sealed this

Sixteenth Day of August, 1988

*Attest:*

DONALD J. QUIGG

*Attesting Officer*

*Commissioner of Patents and Trademarks*